No. 889,911. PATENTED JUNE 9, 1908.
F. DARLINGTON.
SYSTEM OF DISTRIBUTION FOR DIRECT CURRENT.
APPLICATION FILED JUNE 25, 1906.

WITNESSES:
C. L. Belcher
Otto S. Schauer

INVENTOR
Frederick Darlington
BY
Wesley G. Carr
ATTORNEY

UNITED STATES PATENT OFFICE.

FREDERICK DARLINGTON, OF PITTSBURG, PENNSYLVANIA, ASSIGNOR TO WESTINGHOUSE ELECTRIC & MANUFACTURING COMPANY, A CORPORATION OF PENNSYLVANIA.

SYSTEM OF DISTRIBUTION FOR DIRECT CURRENT.

No. 889,911.      Specification of Letters Patent.      Patented June 9, 1908.

Application filed June 25, 1906. Serial No. 323,368.

*To all whom it may concern:*

Be it known that I, FREDERICK DARLINGTON, a citizen of the United Sates, and a resident of Pittsburg, in the county of Allegheny and State of Pennsylvania, have invented a new and useful Improvement in Systems of Distribution for Direct Current, of which the following is a specification.

My invention relates to systems of electrical distribution, and particularly to systems for supplying direct current to electric railway motors and other translating devices.

The object of my invention is to provide means whereby the distribution of direct current to railway and other systems at comparatively high voltages and the utilization thereof by translating devices at lower voltages may be effected.

The maximum voltage at which direct current may be supplied to motors depends upon the voltage to which the insulation may be safely subjected, and upon that at which successful commutation may be effected.

In railway or other motors that are subjected to severe service, the former condition usually controls, though both conditions may render it impracticable to apply more than six or seven hundred volts to the motors, which low voltages, however, cannot be economically transmitted over long distances.

According to the present invention, I propose to provide railway vehicles with two or more dynamo-electric machines that are coupled together and are connected in series relation, and to connect the propelling motors for the vehicles between the terminals of one or more of the machines, the remaining machines, which serve as motors, being preferably insulated therefrom and from other parts. The voltage of the distributing system may then be equal to the sum of the voltages of the individual machines, while that applied to the propelling motors will be the voltage of the machine or machines between the terminals of which they are connected. If the motors of the motor-generator set are placed in the circuit nearest the trolley conductor and are insulated from the generators and from the earth, the strains upon the insulation of the machines may not be excessive, especially since they are subjected to less severe service than the propelling motors and may also be more easily insulated.

Figure 1:
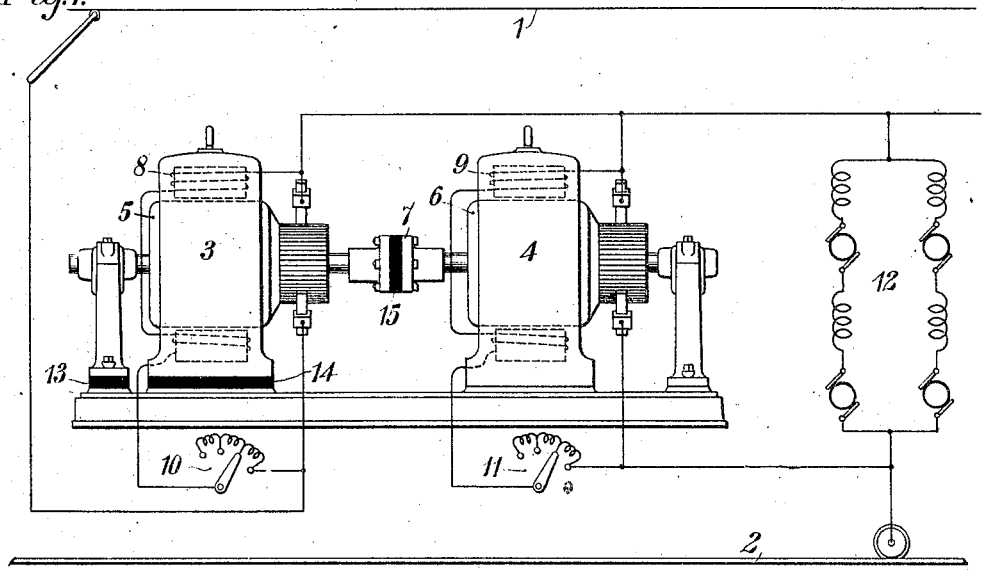
Figure 2:
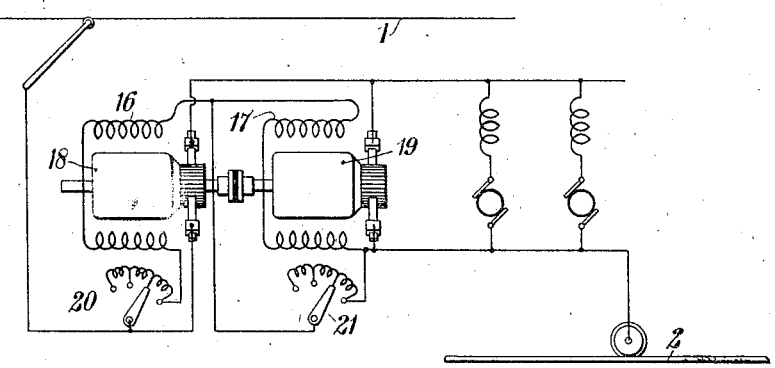
Figure 3:
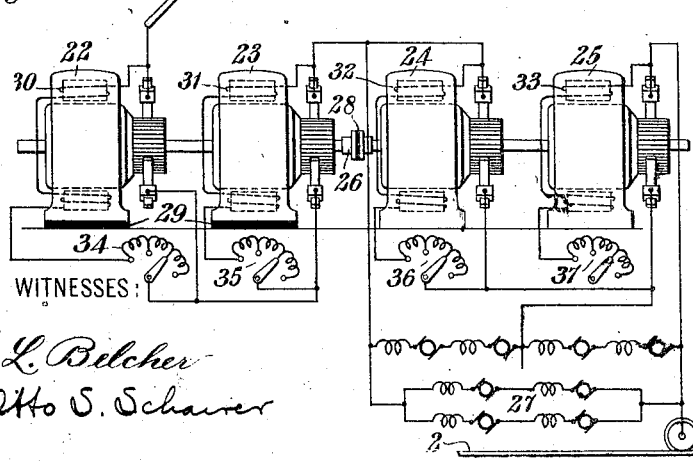

Figure 1 of the accompanying drawings is a diagrammatic view of a system that embodies my invention. Fig. 2 is a diagram of a modification of the system of Fig. 1, and Fig. 3 is a diagram of another modification of the invention.

Connected in series relation between the distributing conductors of an electrical circuit, such as a trolley conductor 1 and a track rail 2, are dynamo-electric machines 3 and 4, the former of which is adapted to operate as a motor and the latter as a generator, and the rotatable armatures 5 and 6 of which are mechanically connected by means of a coupling 7. Field magnet windings 8 and 9 of the dynamo-electric machines may be connected in shunt relation to the armatures thereof, and the field strengths may be adjusted by means of rheostats 10 and 11.

Connected between terminals of the machine 4 are a plurality of translating devices 12, such as the propelling motors for the vehicle. In operation, current is supplied to the motors 12, both from the distributing circuit and from the generator 4, and consequently the generator need be of capacity sufficient to supply only half of the current required by the motors, and the capacity of the motor 3 need be but slightly greater than that of the generator. The voltage applied to the motors 12 will be that of the generator 4, while the difference of potential between the trolley conductor 1 and the track rail 2 will be equal to the sum of the voltages of the motor 3 and the generator 4. Since the voltage applied to the motors 12 will depend upon the speed of rotation of the armature and upon the field strength of the generator, the rheostats 10 and 11 may be employed to effect variation thereof. The generator 4 and the motors 12 being arranged nearest the grounded side of the circuit, little or no danger exists of applying excessive voltages thereto and of thus subjecting the insulation thereof to abnormal strains.

In order to relieve the strain upon the insulation of the motor 3, it may be mounted upon insulating blocks 13 and 14 and an insulating block 15 may be placed between the parts of the coupling 7, the machine being in this manner entirely insulated from the ground and from the remaining machines except through the series connection.

A distinct advantage that may be derived from the employment of the system of the present invention over other motor-generator systems of distribution, is that the capacity of each of the machines 3 and 4 need be but approximately half the aggregate capacity of the translating devices 12, while in other systems each machine must have substantially the same capacity as the aggregate capacity of the translating devices. It will, of course, be understood that the voltages applied to the individual propelling motors may also be varied by changing the circuit relations thereof, as by changing them from series to parallel relation, or from series to series-parallel relation, etc.

It may be desirable, in many cases, to adjust the field strengths of the motor and generator simultaneously, and accordingly in Fig. 2 I have shown field magnet windings 16 and 17 of machines 18 and 19, respectively, as connected in series relation, with a rheostat 20 between the trolley conductor 1 and the track rail 2. The field strength of the generator may also be adjusted independently of that of the motor 18 by means of a rheostat 21 connected in shunt relation to the field magnet winding 17.

In order to provide for the application of a greater range of voltages to the propelling motors of a vehicle and also the utilization of a higher voltage between the trolley conductor and the track rail, a greater number of machines than two may be employed in the motor-generator set, as shown in Fig. 3, in which armatures of motors 22 and 23 are mechanically connected to armatures of generators 24 and 25 by means of a coupling 26, motors 27 being connected, in suitable circuit relations with respect with each other, between the terminals of either generator, or between the outer terminals of both generators, as desired. The strains upon the insulation of the motors 22 and 23 may be relieved by insulating them from the generators 24 and 25 by means of an insulating block 28 placed between the parts of the coupling 26, and by mounting the frames upon insulating blocks 29. If desired, the motors 22 and 23 may also be insulated from each other in a similar manner to that in which the motors are insulated from the generators. Field magnet windings 30, 31, 32 and 33 of the machines 22 to 25, inclusive, are connected respectively in shunt to the corresponding armatures, and the field strengths may be adjusted independently of one another by means of rheostats 34, 35, 36 and 37, though, of course, the field magnet windings may be arranged in other suitable relations, and the field strengths may be adjusted by other suitable means.

The invention may be employed with other numbers of machines, if desired, and the arrangements and circuit connections thereof may be varied within considerable limits without altering the mode of operation of the invention or the result secured by it, and I desire that all such modifications shall be included within its scope.

I claim as my invention:

1. The combination with two or more dynamo-electric machines mechanically coupled together and electrically connected in series relation, of a translating device connected between terminals of one or more of the machines, and means for insulating one or more of the machines from the others and also from the ground.

2. The combination with two or more dynamo-electric machines mechanically coupled together and electrically connected in series relation, of a translating device connected between the terminals of one or more of the machines, and means for similarly and simultaneously varying the field strengths of the machines.

3. The combination with two or more dynamo-electric machines mechanically coupled together and electrically connected in series relation, and field magnet windings therefor connected in series relation, of means for similarly and simultaneously adjusting the field strengths of the machines, and a translating device connected between the terminals of one or more of the machines.

4. The combination with one or more motors and one or more generators mechanically coupled together and electrically connected in series relation, of a translating device connected between the terminals of one or more of the generators, the motor or motors being insulated from the generator or generators and from the ground.

5. The combination with two or more dynamo-electric machines mechanically coupled together and electrically connected in series relation, of means for similarly and simultaneously adjusting the field strengths of the machines, means for independently adjusting the field strength of at least one of the machines, and a translating device connected between the terminals of one or more of the machines.

6. The combination with two or more dynamo-electric machines mechanically coupled together and electrically connected in series relation, and field magnet windings therefor connected in series relation, of means for similarly and simultaneously adjusting the field strengths of the machines, means for independently adjusting the field strength of at least one of the machines, and a translating device connected between the terminals of one or more of the machines.

7. The combination with two or more dynamo-electric machines mechanically coupled together and electrically connected in series relation, and field magnet windings therefor connected in series relation, a variable resistance in series with the field magnet windings, a variable resistance independently associated with the field magnet winding of one of the machines, and a translating device connected between the terminals of one or more of the machines.

In testimony whereof, I have hereunto subscribed my name this 15th day of June, 1906.

FREDERICK DARLINGTON.

Witnesses:
 OTTO S. SCHAIRER,
 BIRNEY HINES.